(12) United States Patent
Kiesow et al.

(10) Patent No.: US 6,443,446 B1
(45) Date of Patent: Sep. 3, 2002

(54) MEDIA TRANSPORT MECHANISM FOR INFORMATION TRANSFER DEVICES

(75) Inventors: Ronald H. Kiesow, Spencerport; Raymond E. Wess, Holley, both of NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/618,660

(22) Filed: Jul. 18, 2000

(51) Int. Cl.[7] .............................................. B65H 29/58
(52) U.S. Cl. ..................................................... 271/184
(58) Field of Search ................................ 271/184, 186, 271/902

(56) References Cited

U.S. PATENT DOCUMENTS

| | | | | |
|---|---|---|---|---|
| 4,487,506 A | * | 12/1984 | Repp et al. ..................... 355/14 |
| 4,883,266 A | * | 11/1989 | Fujii ........................... 271/291 |
| 5,215,298 A | * | 6/1993 | Stemmle et al. .............. 271/65 |
| 5,438,435 A | * | 8/1995 | Lawniczak ................... 358/496 |
| 5,669,056 A | * | 9/1997 | Rubscha ...................... 399/367 |
| 5,784,680 A | * | 7/1998 | Taruki ......................... 271/291 |
| 5,887,865 A | * | 3/1999 | Ishimaru ...................... 271/4.7 |
| 5,903,811 A | * | 5/1999 | Kobayashi et al. .......... 399/367 |
| 6,186,497 B1 | * | 2/2001 | Johnston ..................... 271/186 |
| 6,206,817 B1 | * | 3/2001 | Sette et al. .................. 493/421 |
| 6,209,861 B1 | * | 4/2001 | Kakuta et al. .............. 271/3.02 |
| 6,241,236 B1 | * | 6/2001 | Bokelman ................... 271/3.01 |

* cited by examiner

*Primary Examiner*—Donald P. Walsh
*Assistant Examiner*—Joseph Rodriguez
(74) *Attorney, Agent, or Firm*—Wendy K. B. Buskop

(57) ABSTRACT

An apparatus for transferring media (2) to and from an information transfer device (1) consisting of a media supply tray (36) for holding the media (2) and a drive roller (8). The first idle roller (10) forms a first nip for moving the media (2) from the media supply tray (36) to the information transfer device (1). The drive motor (4) is connected to the drive roller (8) for rotating the drive roller (8). The deflector (44) is located between the first nip and the information transfer device (1). The second idle roller (18) forms a second nip with the drive roller (8) for moving the media (2) from the information transfer device (1) to an exit tray (34) when the deflector (44) is in a second position.

9 Claims, 7 Drawing Sheets

MEDIA TRANSPORT MECHANISM FOR INFORMATION TRANSFER DEVICES

FIELD OF THE INVENTION

This invention relates generally to electronic paper handling devices, namely paper handling mechanisms for printing devices, copying, scanning, facsimile sending and receiving devices, and more particularly to the mechanisms for feeding media stock into these devices.

BACKGROUND OF THE INVENTION

Paper handling devices are part of a printer, devices for producing a recorded image, and can also be found in association with scanning devices for electronically or optically sensing a recorded image for later modification, facsimile devices for electronically sending or receiving an image over a voice frequency circuit, and copying devices for reproducing a recorded image. Paper handling has involved the use of a wide variety of cams, rollers, motors and guides which can take a significant amount of space in association with the above devices. The number of parts and size of this device relate to the cost to manufacture and cost to use the devices. There has been an interest in reducing the number of parts needed to accomplish the same task, so as to minimize repair bills, and the cost to manufacture the base device. Thus, effort has been spent to create a paper transport devices attachable to the above devices that can accomplish multiple tasks at a lower cost, requiring fewer parts and smaller space.

Typical printing devices, which utilize paper transport mechanisms, include dot matrix, ink and laser printers. Dot matrix printers generate characters on a page with a matrix of dots and the aid of an inked ribbon and use guides and motors for moving paper into the printer. The Apple Stylewriter Inkjet printer series, for example utilizes a motor to dive a carriage containing an ink cartridge back and forth along the width of a sheet of paper according to electronically received information, such as from a computer. The paper is moved into the machine in one direction, then out the other side. The device requires paper guides in two places, taking up additional height in the device. There is no bi-directional option, which would enable the paper to move in two directions with only one motor. In another commonly used printing device, the laser printer paper is moved with two sets of motors and two sets of cams and paper guides to pass through the printer.

The different printing devices utilize various methods to position a sheet of paper for printing. Some printing devices operate by "tractor feed" wherein continuous feed paper is fed through the printing device by way of sprockets. Typically, at least one sprocket is located on each side of the printing device. The sprockets are positioned to correspond with opening in the continuous feed paper. The continuous feed paper is aligned to travel through the printer squarely and only in one direction by positioning the complimentary openings on either side of the continuous paper with complimentary projections in the sprockets.

A method to position separate sheets of paper for printing is by aligning the paper squarely in a paper tray or a holder and using the tangential force imparted by a roller to move a single sheet in position for copying or printing. According to this method, a rotatable roller shaft extends the width of the sheet-feed opening of a printing device. A roller is attached to all or part of the roller shaft. Individual sheets of paper are aligned in a paper tray or a cassette to travel through the printing device squarely through the use of paper guides that correspond to the width and or the length of the individual sheets of paper to be printed. An individual sheet of paper is selected for printing by positioning the sheet in contact with the roller and rotating the roller in a direction to move the paper through the printing device. The individual sheet of paper is positioned in contact with the roller either by force, such as spring tension, or the movement of the paper tray in a direction that will achieve contact with the roller.

Roller driven feed mechanisms use adjustable paper guides to square the paper within a tray so that the paper feeds through the printing device and the printing is formatted correctly on the paper. Additional paper in the paper tray of the roller driven feed mechanism described above encounter problems associated with fanning and skew. Fanning occurs when the paper remaining in the paper tray spreads out and fans toward the printing mechanism causing more than a single sheet of paper to be retrieved by the roller and sent through the printing mechanism. Fanning is a particular problem with those printing devices like the Apple Stylewriter series printers that pivot the paper tray to establish contact between the paper tray and the single sheet of paper. As the paper tray pivots forward and the D-roller selects sheet after sheet of paper, the sheets remaining in the paper tray slowly fan forward and eventually come in contact with or are transported by the D-roller into the printing device.

The present invention is designed to minimize fanning while using fewer parts and a bi-directional movement system, which minimizes the size, needed for the information transport device to which the media transport mechanism is engaged.

There exists a need for an inexpensive information transfer feed device that can provide the functionality of bi-directional feed without the need for two motors, two drivers, two sets of each part.

SUMMARY OF THE INVENTION

The invention incorporates bi-directional functionality into a roller driven device for transferring media to an information transfer device without the additional space or expensive requirements associated with bi-directional transfer devices.

According to one aspect of the present invention, an apparatus for transfer media to and from an information transfer device comprises a media tray for holding the media. A drive roller and a first idler roller form a nip for moving the media from the media supply tray to the information transfer device. A drive motor connected to the drive roller rotates the drive roller. A deflector is located between the first nip and the information device. The deflector shifts to a second position to transfer the media from the transfer device to a second nip formed by a second roller and the drive roller. The drive roller, which is in contact with the first and the second roller rotates in only one direction. By moving the deflector between a first and second position the single drive motor and single motor are able to transfer media to and from the information transfer device without reversing the direction of the motor or using a second motor.

The current invention provides an apparatus whereby all stock enters through a single feed port and the invention can utilize the same roller and the same document path for both intake of feed and exit of media containing transferred information. The invention provides the functionality of bi-directional feed in a compact physical space at an inexpensive cost.

The invention can be any information transfer device, such as a scanner, facsimile sending and receiving device, a copier, or a printer.

It is within the scope of the present invention to use different medias in various quantities can be placed in the feed tray.

The invention and its objects and advantages will become more apparent in the detailed description of the preferred embodiment presented below.

BRIEF DESCRIPTION OF THE DRAWINGS

The invention is illustrated by way of example and is not limited to the figures of the accompanying drawings, in which like references indicate similar elements and in which.

DETAILED DESCRIPTION OF THE INVENTION

The invention has been described in detail with particular reference to certain preferred embodiments thereof, but it will be understood that variations and modifications can be effected within the scope of the invention.

All information transfer devices, such as scanners, facsimiles, copiers and printers can be used with the present invention. In addition, the invention contemplates uses for multipurpose information transfer devices that combine any or all of scanning devices, facsimile devices, copying devices and printing devices.

Figure 1:
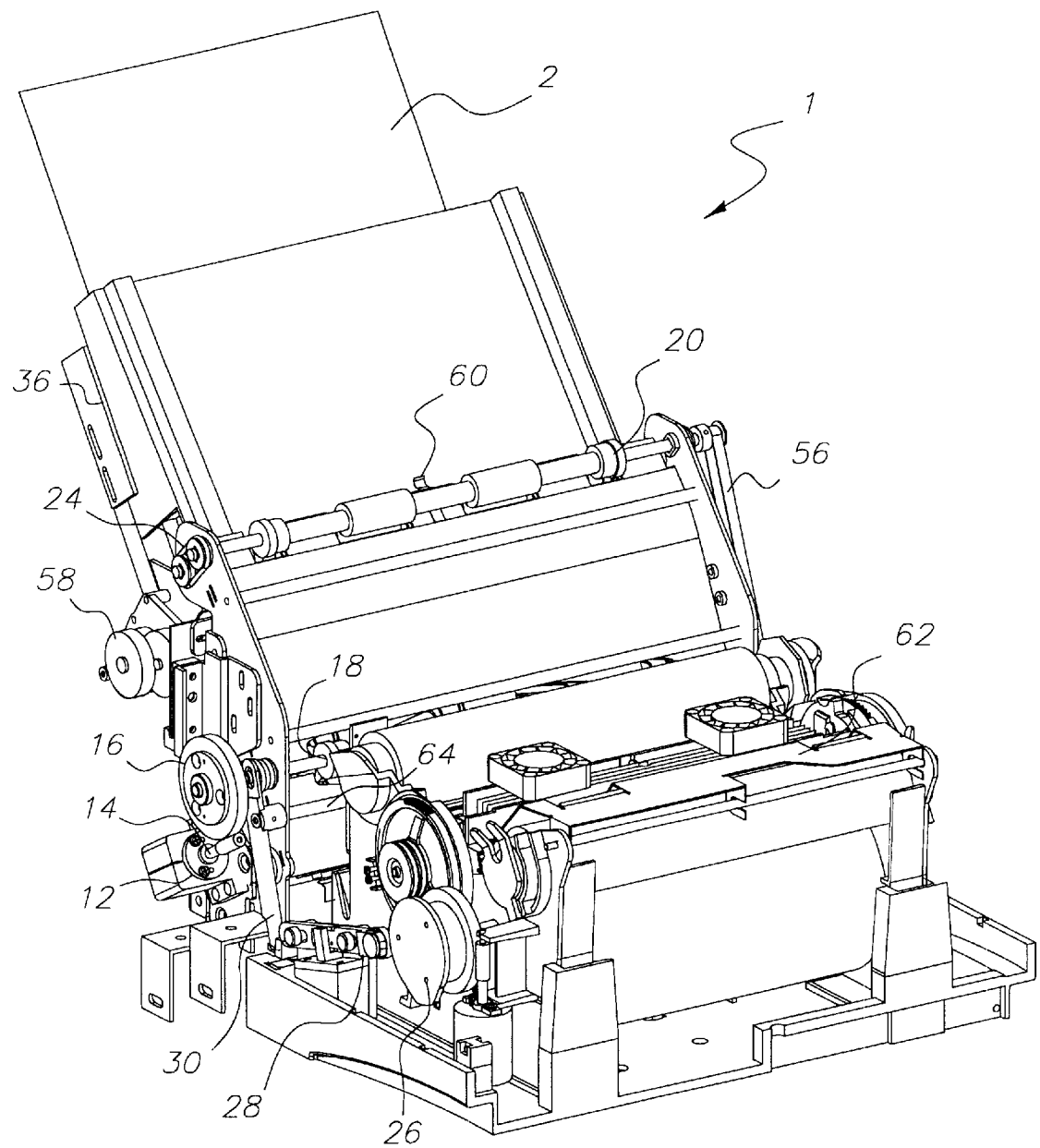
FIG. 1 is a front perspective view of the invention with an attached transfer device.

The invention has the capacity to maintain the alignment of media and move media in a bi-directional manner using various forms of media. Usable medias include, but are not limited to paper, paper derivatives, envelopes, and cards, labels, transparencies, plastic and plastic derivatives. Usable medias also include documents containing an image wherein the documents are transported from the supply tray into the information transfer device to process an image to an electronic image (such as a scanning function) or to a facsimile function, or to a reproduction function with the aid of a printing device. In FIG. 1, the embodiment presented shows the invention as an information transfer device based on the design of a printer 1.

FIG. 1 specifically shows an apparatus comprised of a media supply tray 36. Media 2 can be loaded into media supply tray 36. Initial loading of media 2 into the printer 1 is accomplished by energizing the D roller drive motor which appears in FIG. 2 as motor 4. Motor 4 is the driver motor for D roller 6 shown in FIG. 3. Exit rollers 20 and 22 are restrained by the first spring 24 shown in FIG. 2. FIG. 3 also shows use of a exit tray 34 for holding processed media yielded from the information transfer device 1 motor 4 is actuated preferable by a microcontroller (not shown). After motor 4 engages, and one revolution is made of the D roller 6, a second roller drive motor 12 initializes which drives media drive gear 16 shown in FIG. 2. Media drive gear 16 rotates media roller 8. Drive roller 8 is tangentially in contact with first idle roller 10 and second idle roller 18. Rollers 18 and 10 are held by a spring 24 (not shown) against drive roller 8. Drive roller 8 is a stationary roller driven by media drive gear 16. Rollers 18 and 10 are movable rollers. Spring 60 provides a downward pressure on the media when exiting transport mechanism.

Figure 7:
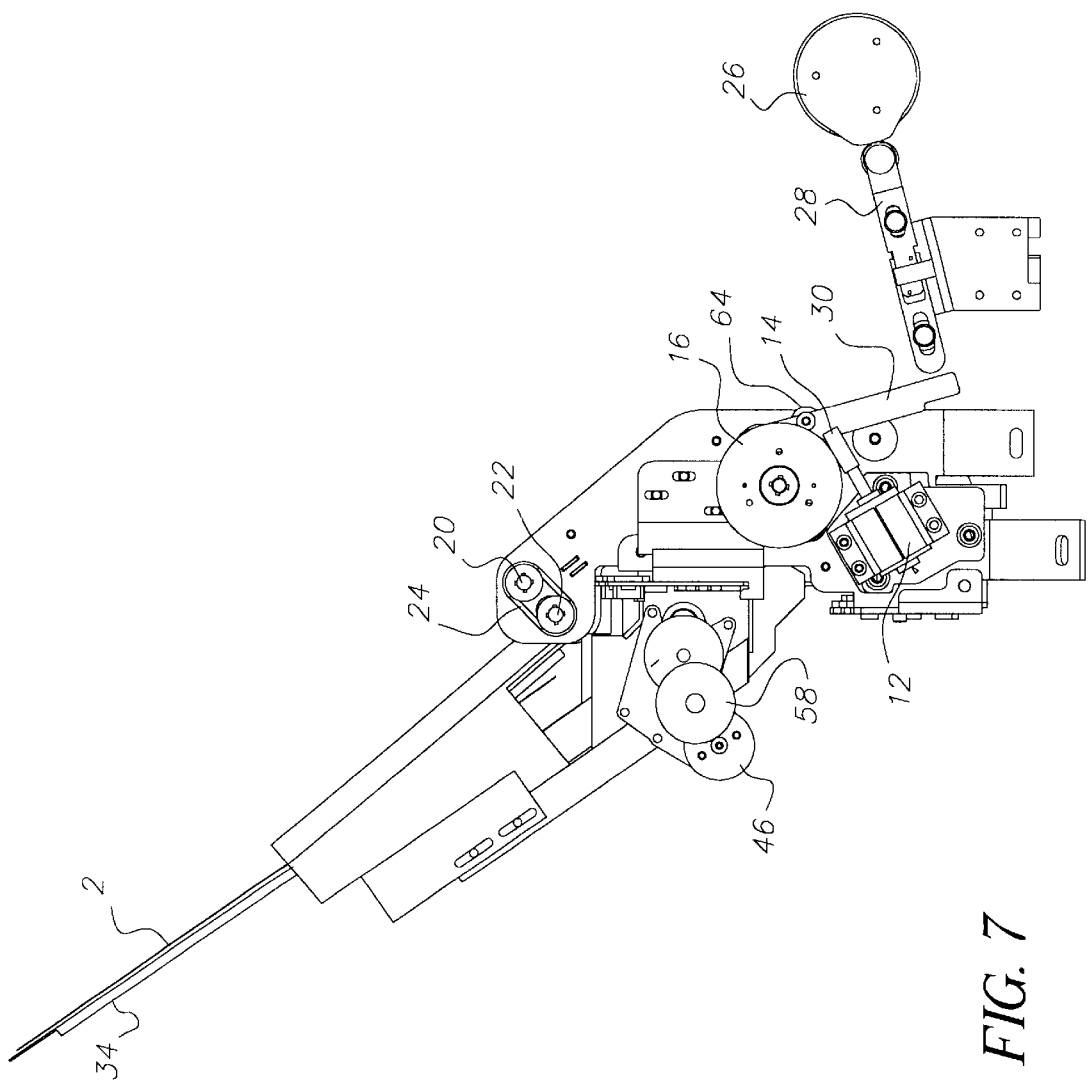
FIG. 7 is a side view of the roller portion of the invention.

When media 2 such as paper is loaded, rollers 8, 10, and 18 are turning. Rollers 10 and 18 go into a first direction, preferably clockwise, while drive roller 8 turns in the opposite direction, counter clockwise. Belt 56 is attached to drive roller 8 and exit roller 20. Belt 56 also drives exit roller 20 and exit roller 22 as shown in FIG. 7.

Figure 5:
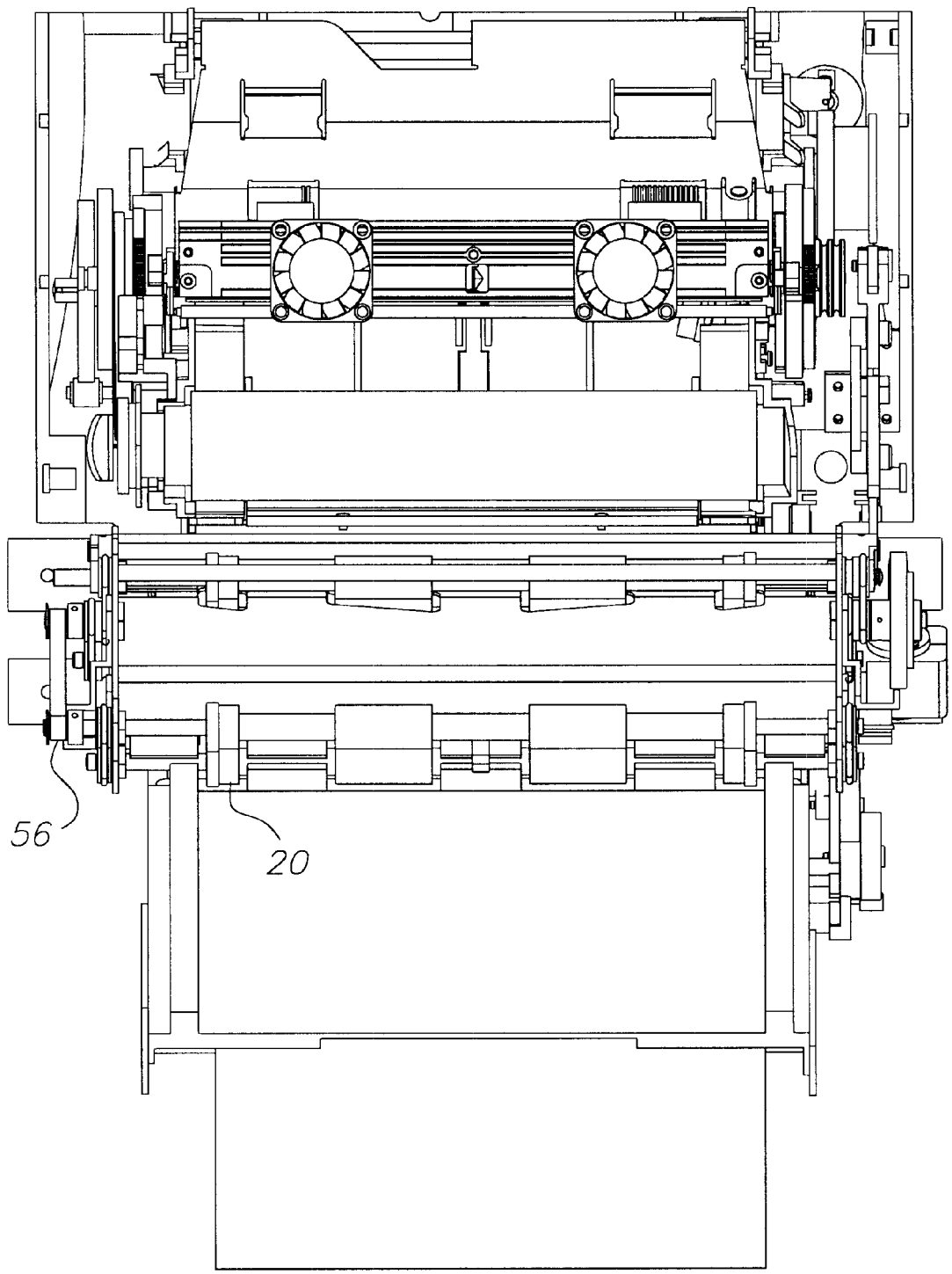
FIG. 5 is a top plan view of the invention with the printer attached.
Figure 6:
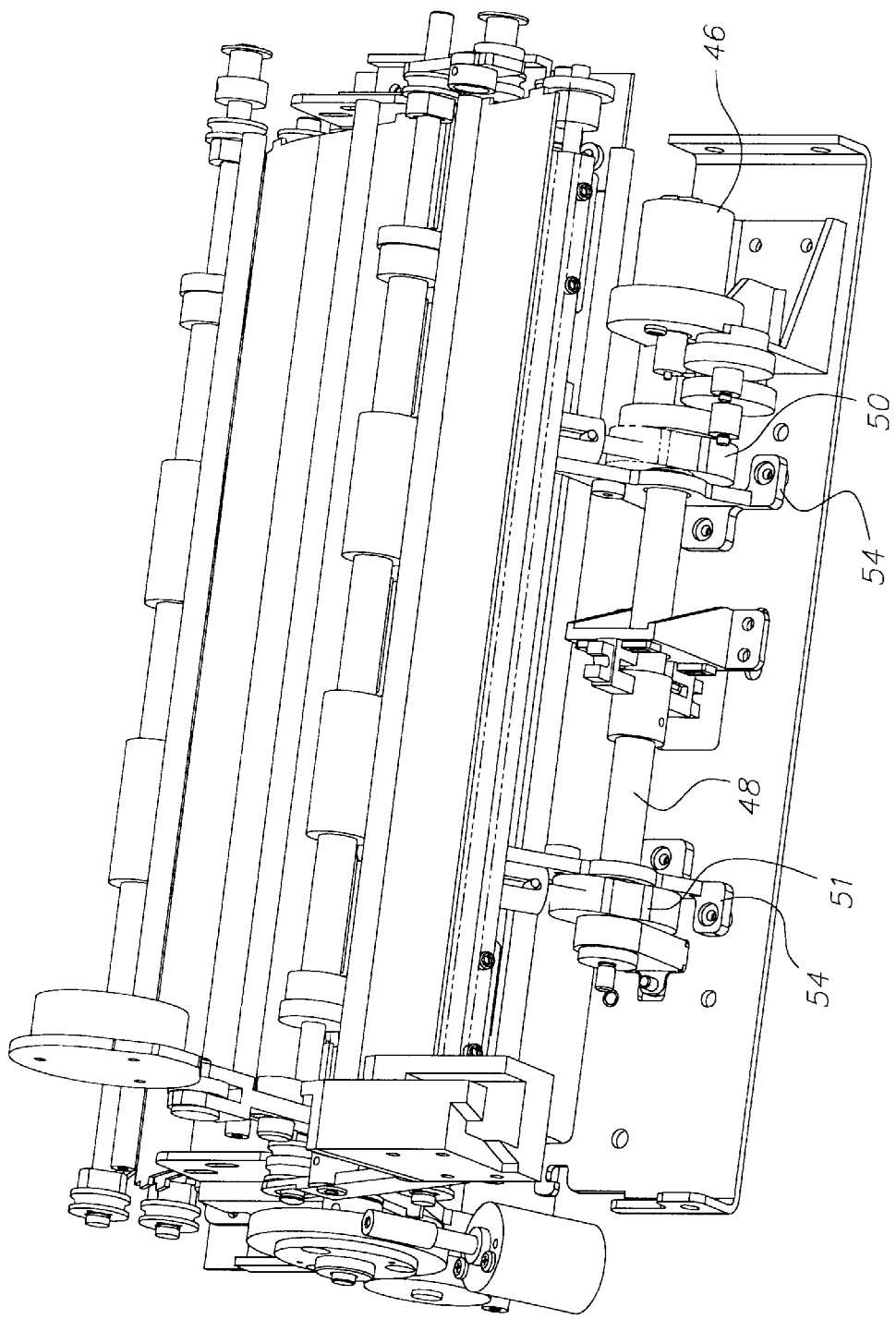
FIG. 6 is a rear perspective view of a portion of the invention of FIG. 1.

Referring again to FIG. 1, media drive gear 16, and gear 14 are driven by roller drive motor 12, which also drives roller 8 which continues to move media 2 through the information transfer device 1. Finally the media arrives at the printing or information transfer position in the device. Referring now to FIGS. 5, 6, and 7 an cam motor 46 is actuated which turns first shaft 48 on which two cams 50 and 51 are located as shown in FIG. 6. In the preferred embodiment, only one cam is needed. The cams rotate 180 degrees. Housing 54 contains a first shaft 48 on which cams 50 and 51 are located and used with deflector component 44 shown in FIG. 5. The shaft can be cammed to move it the four to six degrees needed to move the media deflector from the load to the unload position.

After printing or other information transfer is completed, the media is caused to exit the information transfer device by the following process; a third cam 26 (shown in FIG. 2) moves 90 degrees clockwise pushing first lever 28 towards the unload position. As the first lever 28 moves axially contacting second lever 30 causing it to pivot about a fixed axis. Second lever 30 is a lever having two slots, one on each end, which attach to the shaft of second idle roller 18. Second lever 30 pivots about a shaft 64 shown in FIG. 1, which allows second idle roller 18 to pivot in a minimal manner so that second idle roller 18 is no longer in contact with drive roller 8. As more easily seen in FIG. 1, first lever 28 specifically engages a third cam 26 rotating it 90 degrees. This moves first lever 28 in a linear manner causing second lever 30 to pivot about shaft 64. This pivoting action moves drive roller 8 out of engagement with second idle roller 18. When second idle roller 18 disengages, media is translated into the exit path and moved away from the information transfer area. The cam 26 engagement of the levers 28 and 30 which causes the disengagement of rollers 8 and 18 permits the bi-directional feed of the media 2 with the use of a unidirectional drive motor 12.

The camming assembly shown in FIG. 6 changes the position of the media 2 deflector between the load to unload positions. Roller rotation determines the direction in which the media travels, enables a first direction of travel for media 2 towards the information transfer area, and then a second and opposite direction for media 2 through the exit path out of the information transfer device 1. The drive mechanism of the information transfer device moves the media 2 between rollers 8 and 18 into the proper unload position. Attached to the information transfer device 1, a third cam 26 moves back 90 degrees and the rollers 8 and 18 re-engage. After they re-engage, the rollers 8 and 18 grab media 2 and transport it through exit rollers 20 and 22 which are driven by the rotation of roller 8 and into the exit tray 34

Figure 2:
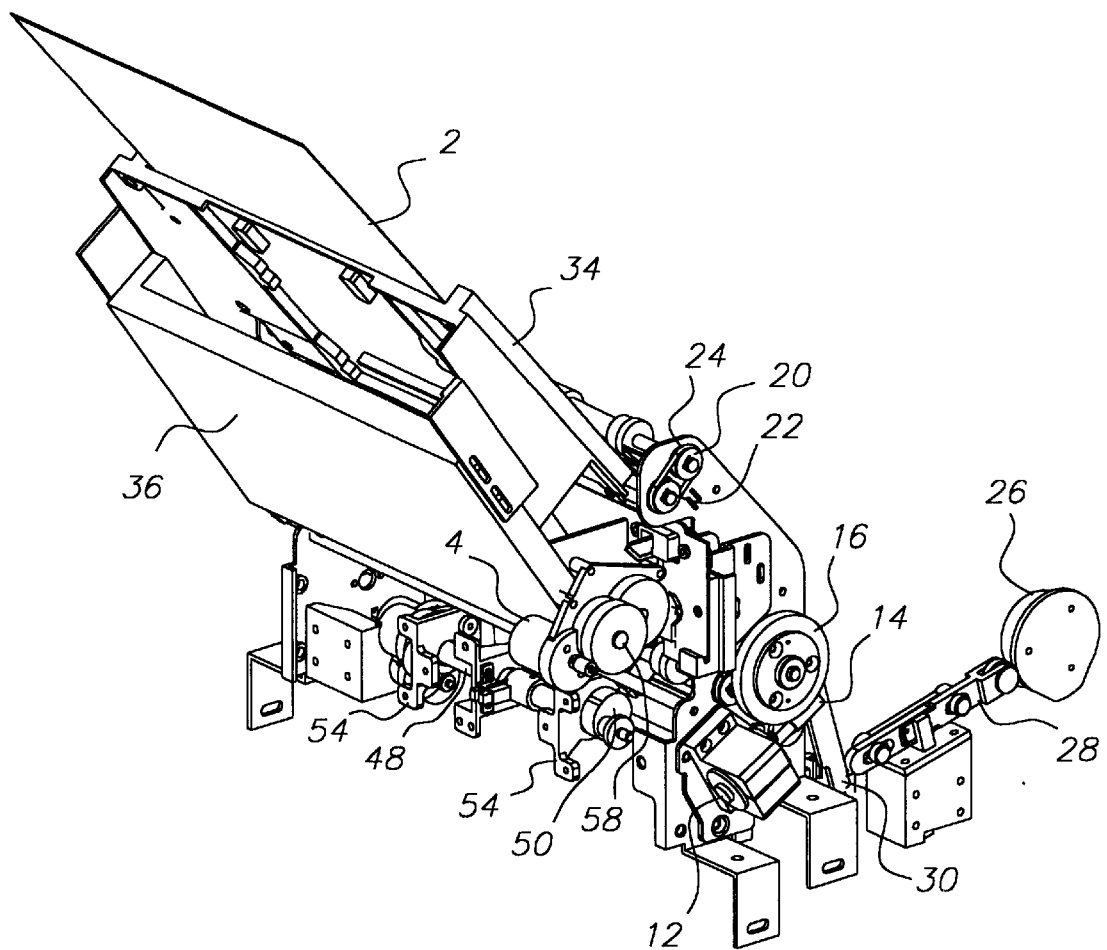
FIG. 2 is a rear perspective of a second embodiment of a printer version of the present invention.
Figure 3:
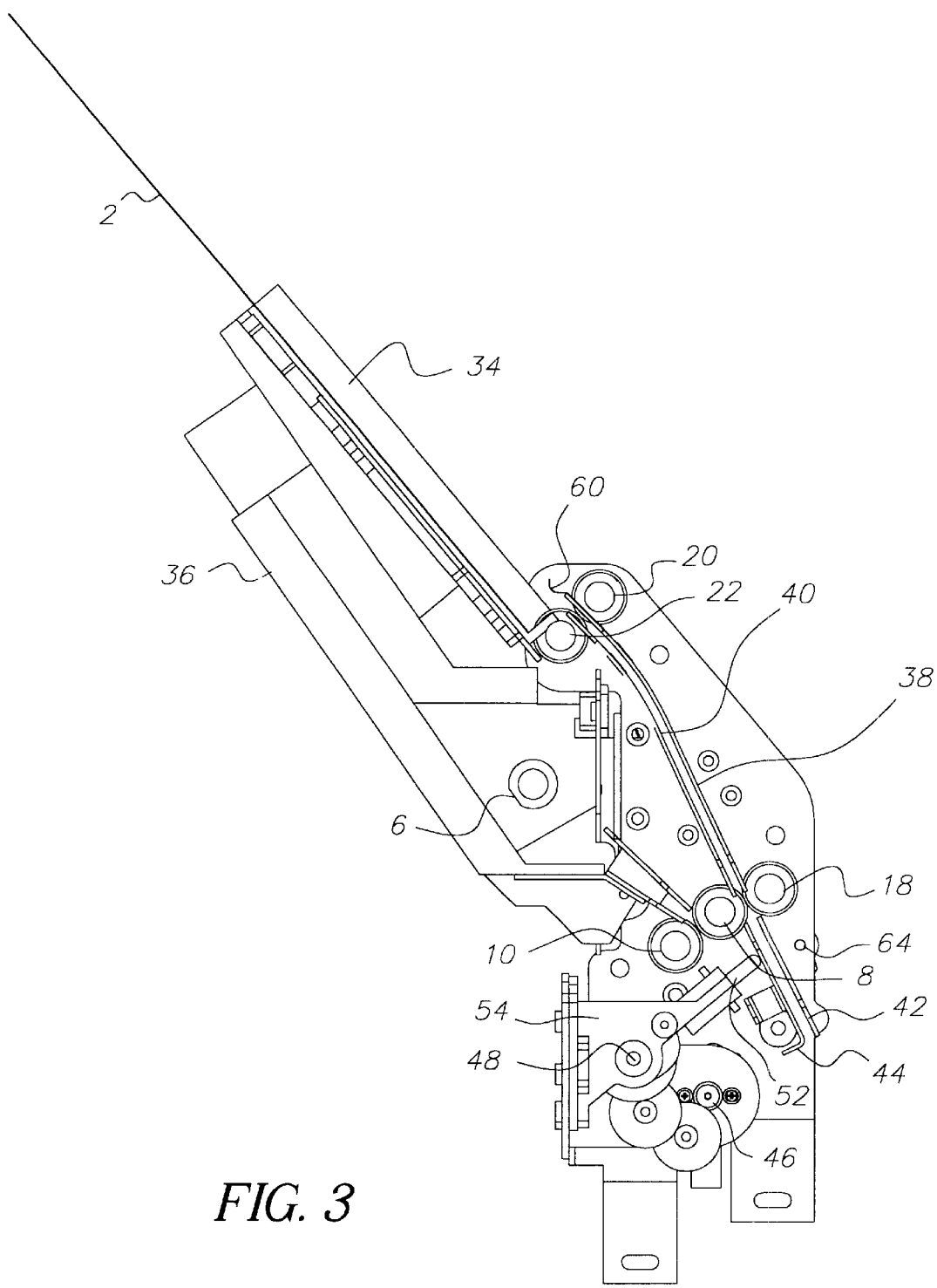
FIG. 3 is a cross sectional view of the invention in the unload position without a printer attached.

FIG. 2 presents a rear perspective view, which shows media 2 situated in the exit tray 34 which has the capacity to hold multiple media's. In this perspective, "D" roller is engageable with gear train. Roller drive motor 12 engages the first gear 14, which is directly engaged with media drive gear 16 which is attached to drive roller 8, (not shown in this Figure) first gear 14 and media drive gear 16 are connected. In this embodiment housing 54 is shown housing first shaft 48 on which are located cams 50 and 51.

FIG. 3 is the side view of an embodiment of the invention shown in the unload position. Although parts of this Figure have been discussed it should be noted that in this embodiment media 2 travels past exit rollers 20 and 22 between a first stationary component 38 and a second stationary component 40. Upon exiting the image transfer device the media passes through deflector component 44 and is captured between rollers 8 and 18 and third stationary component 42. Housing 54 is shown as well.

Figure 4:
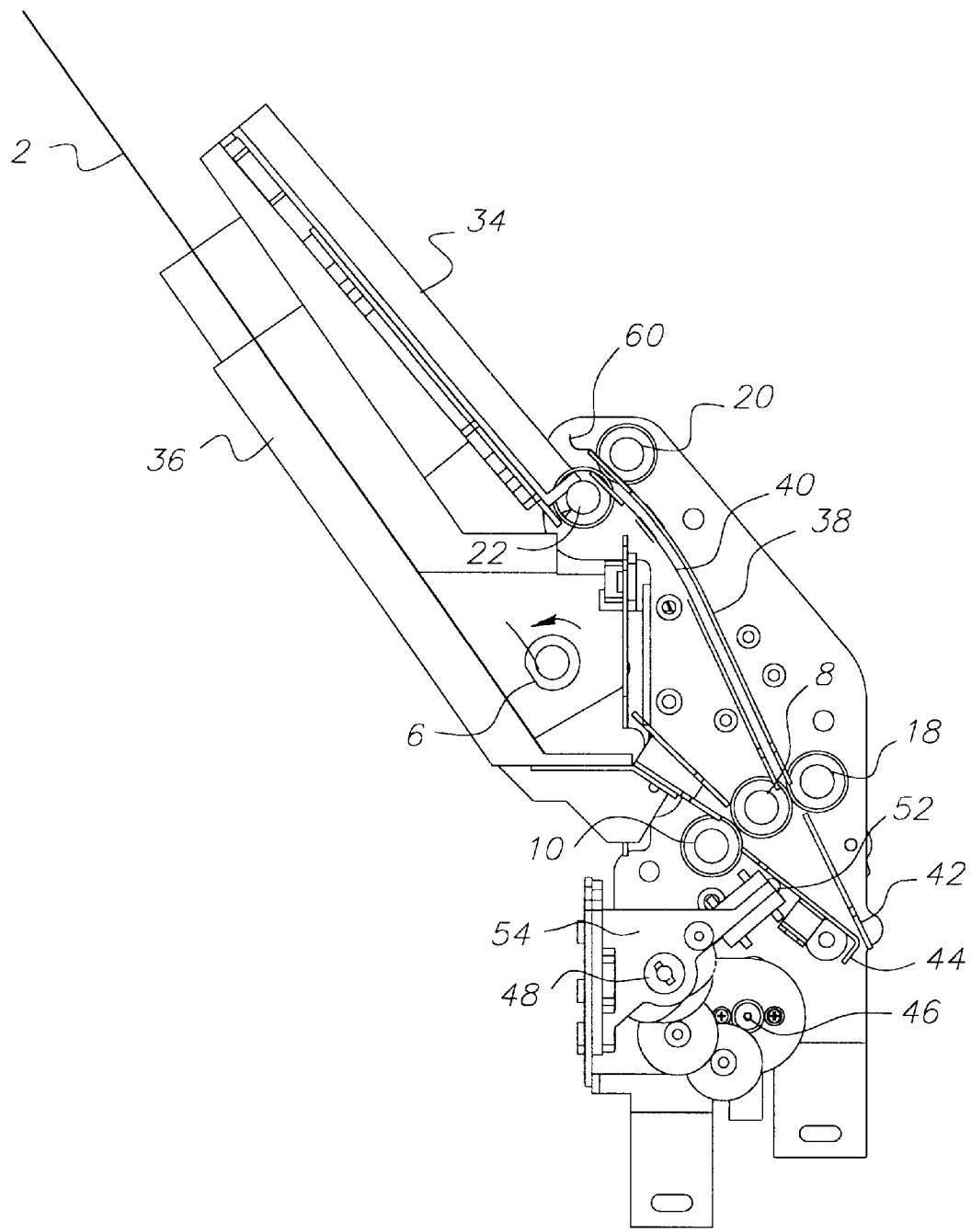
FIG. 4 is a cross sectional view of the invention in the load position.

FIG. 4 is a cross sectional view of an embodiment of the present invention in the load position, which shows shaft 52 adjacent to deflector component 44.

FIG. 5 is a top view of an embodiment of the invention showing exit roller 20 engaged with belt 56 and the location of second shaft 64, shown in FIG. 1.

The levers 28, 30 AND 32 have no relationship with gears 14 and 16. Their function is to disengage rollers 8 and 18 during the initial portion of the unload media cycle. This is necessary since the motor used to transport the media and roller drive motor 12 operate at different speeds. First lever 28 engages third cam 26 but does not change any gearing or the direction of the rollers. It is the engagement of the rollers 8, 10 and 18 and their direction of rotation which allows the media 2 to travel in two directions using a unidirectional drive motor 12.

FIG. 7 shows an embodiment of the invention with media 2 located in exit tray 34. Media is urged into exit tray 34 after transfer of information onto the media is complete. One tray can both supply blank media and receive printed media. The rollers are driven by a roller drive motor 12 which engages a first gear 14 which turns a second gear 16

It should be appreciated that in the Figures, first stationary component 38 and a second stationary component 40 are in substantially parallel alignment to each other. At one end of first stationary member 38, an exit roller 20 is engagably attached and at the other end, a second idle roller 18 is engagably attached. Similarly, at one end of second stationary component 40, exit roller 22 is secured and at the other end, drive roller 8 is engagably attached. Attached to second idle roller I8 is a third stationary component 42. Deflector component 44 lies atop a shaft 52 that is positioned by cams 50 and 51. A cam motor 46 engages first shaft 48 to which cams 50 and 51 are attached. It should be noted that deflector 44 is shown in the load position in FIG. 4.

Referring again to FIGS. 1–5, media 2 in one embodiment, media 2 can be loaded into a printer from the media supply tray 36. This initial loading of the media 2 is accomplished by energizing the motor 4 to drive "D" roller 6. This "D" roller when rotated by motor 4 and gear train 58 engages the media 2 for one revolution, translating the media until it is engaged by rollers 8 and 10. In the preferred embodiment, the "D" rollers are radially attached to the gear train. Shortly before engagement, roller drive motor 12 is energized generating a rotary motion in gears 14 and 16. Media drive gear 16 is attached to drive roller 8 when rotated. Drive roller 8 provides motion to the adjacent rollers 10 and 18. Rollers 10 and 18 are constrained against drive roller 8 by three springs 24. The springs provide a constant force between rollers 8, 10 and 18 thereby ensuring a continuous rotary motion. After media is captured by rollers 8 and 10 it is transported through the deflector component 44 into position in for printing or similar information transfer.

When printing or information transfer is complete, it is necessary to extract the media 2 from the information transfer device 1. This is accomplished by translating media to a position where it will be re-captured by rollers 8 and 18. Continuous energizing of roller drive motor 12 translates the media through rollers 8 and 18 until it becomes captured by rollers 20 and 22 which are driven by belt 56 attached to rollers 8 and 20. When media has passed through rollers 20 and 22, the spring 60 applies a downward force to the media directing it to a position in the exit tray 34 where the consumer retrieves it.

To prevent overloading or stalling of the roller drive motor 12 it is necessary when extracting the media to disengage rollers 8 and 18 while the media is exiting the information transfer device 1. Rollers 8 and 18 must be disengaged since the printer media mechanism and the media transport mechanism operate at different speeds. Activation of third cam 26 translates first lever 28 approximately 0.120 inches, which rotates levers 30 and 32. The cam movement can range from 0.20 to 0.1 inches, but 0.120 inches is the preferred distance. With the first lever 28 is rotated, second idle roller 18 disengages from drive roller 8 until the media is located in an acceptable position to allow engagement of rollers 10 and 18. Once the media is in the proper position, third cam 26 rotates allowing the reengagement of rollers 8 and 18. When the media is recaptured, roller drive motor 12 is energized and the media continues to be translated to the exit tray 34.

This design utilizes a motor rotating in one direction and two separate paper guides to insert and extract media from a printer. Therefore, a multipositional guide can be used to ensure the media is captured by the correct set of rollers, both 8 and 10 in the loading position or 10 and 18 in the unloading position.

FIG. 6 depicts a detail of the invention further showing how the housing 54 is mounted, and how first cam 26 engages first lever 28, and second lever 30. It also shows a different view of the first gear 14 connection to roller drive motor 12.

The media guide assembly consists of three stationary components 15 38, 40, 42 and movable deflector component 44 as shown in FIG. 4. Deflector 44 is actuated by cam motor 46 causing first shaft 48 to rotate. Attached to first shaft 48 are two cams 50 and 51 which when rotated translate shafts 52 axially thereby positioning deflector component 44 in either the media load or unload position. Media is then translated through the proper guides by the rollers.

In the preceding detailed description, the invention is described with reference to specific exemplary embodiments thereof. It will, however, be evident that various modifications and changes may be made thereto without departing from the broader scope of the invention as set forth in the claims. The specification and drawings are, accordingly, to be regarded in an illustrative rather than a restrictive sense.

PARTS LISTS

1. Information transfer device or printer
2. Media
4. Motor
6. "D" roller
8. Drive roller
10. First idle roller
12. Roller drive motor 14. First gear
16. Media drive gear
18. Second idle roller
20. Exit roller
22. Exit roller
24. First spring
26. Third cam
28. First lever
30. Second lever
32. Third lever
34. Exit tray
36. Media supply tray
38. First stationary component
40. Second stationary component
42. Third stationary component
44. Deflector component
46. Cam motor
48. First shaft
50. First cam
51. Second cam
52. Shaft
54. Housing
56. Belt
58. Gear train
60. First spring
64. Second shaft

What is claimed is:

1. An apparatus for transferring media to and from an information transfer device comprising:

a media supply tray for holding said media;

a drive roller that rotates in one direction;

a first idle roller which forms a first nip for moving said media from said media supply tray to said information transfer device;

a drive motor connected to said drive roller for rotating said drive roller in one direction;

a deflector disposed on a shaft and located between said first nip and said information transfer device for axial positioning said media relative to the position of the first idle roller; and a first and second cam disposed on either side of the deflector holding said deflector, wherein said first and second cams when rotated translate said shaft to position the deflector;

a second idle roller that forms a second nip with said drive roller for moving said media from said information transfer device to an exit tray using the drive roller that rotates in one direction, when said deflector is in a second position.

2. The apparatus of claim 1 wherein said media is selected from a group comprised of paper, paper-derivatives, envelopes, cards, labels, plastic, plastic derivatives, transparencies, and documents containing an image.

3. The apparatus of claim 1, wherein said information transfer device is a printer, a facsimile, or a copier.

4. A method of transferring media in an information transfer device comprising the steps of:

axially positioning media using a deflector disposed on a shaft into a first position;

moving said media from a media supply tray to a first nip formed by a drive roller that rotates in one direction and a first idle roller;

rotating said drive roller that rotates in one direction to move said media into said information transfer device;

printing information on the said media;

axially positioning media with said deflector on top of said shaft held by a first cam and a second cam, wherein said cams, when rotated translate said shaft hereby positioning the deflector into a second position;

engaging said media in a second nip formed by said drive roller, that rotates in one direction and a second idle roller; and moving said media to an exit tray by rotating said drive roller.

5. A method as in claim 4, wherein said information transfer device transfers paper form said media supply tray to said first nip.

6. A method as in claim 4, wherein said drive roller rotates in one direction to move said media into and out of said information transfer device.

7. The method as in claim 4, wherein said drive roller is disengaged until a portion of said media passes through said second nip.

8. The method as in claim 4, wherein said media is moved from said media supply tray to said first nip by a D transport roller.

9. A method of transferring media in an information transfer device comprising the steps of:

axially positioning said media using a deflector disposed on a shaft into a first position;

moving said media from a media supply tray to a first nip formed by a drive roller that rotates in one direction and a first idle roller;

rotating said drive roller that rotates in one direction to move said media into said information transfer device;

scanning information on said media;

axially positioning media with said deflector on top of said shaft held by a first cam and a second cam, wherein said cams when rotated translate said shaft thereby positioning the deflector into a second position;

engaging said media in a second nip formed by said drive roller that rotates in one direction and a second idle roller; and moving said media to an exit tray by rotating said drive roller that rotates in that same direction.

* * * * *